United States Patent

Takiguchi

[11] Patent Number: 5,882,278
[45] Date of Patent: Mar. 16, 1999

[54] UPSHIFT CONTROL DEVICE FOR AUTOMATIC TRANSMISSION

[75] Inventor: Masahiro Takiguchi, Fuji, Japan

[73] Assignee: Jatco Corporation, Japan

[21] Appl. No.: 900,152

[22] Filed: Jul. 28, 1997

[30] Foreign Application Priority Data

Jul. 31, 1996 [JP] Japan .................................. 8-202508

[51] Int. Cl.$^6$ .................................................. F16H 61/08
[52] U.S. Cl. ........................... 477/151; 477/143; 477/150
[58] Field of Search ..................................... 477/143, 150, 477/151, 152, 156, 158

[56] References Cited

U.S. PATENT DOCUMENTS

| 4,428,258 | 1/1984 | Kubo et al. | 477/151 |
| 4,995,284 | 2/1991 | Takada et al. | 477/151 |
| 5,005,441 | 4/1991 | Narita | 477/151 |
| 5,138,906 | 8/1992 | Iwatsuki et al. | 477/152 |
| 5,405,303 | 4/1995 | Takada et al. | 477/158 X |
| 5,565,001 | 10/1996 | Sakai et al. | 477/143 |

*Primary Examiner*—Dirk Wright
*Assistant Examiner*—Peter T. Kwon
*Attorney, Agent, or Firm*—Rossi and Associates

[57] ABSTRACT

An upshift control device for an automatic transmission is provided in which the transmission is shifted up by releasing an oil pressure from a first engaging element that has been engaged while applying an oil pressure to a second engaging element that has been released. This upshift control device includes an accumulator back pressure control valve using a pressure corresponding to a detected engine load and a pressure applied to the second engaging element as operating signal pressures, for switching from a supply position for supplying a back pressure of the accumulator to a drain position for draining the accumulator when a difference between the two operating signal pressures becomes equal to a predetermined value, a timing valve for selectively supplying or not supplying the pressure applied to the second engaging element to the accumulator back pressure control valve, depending upon a signal received from a valve control actuator, and accumulator back pressure control means for generating to the valve control actuator a command to inhibit the timing valve from being switched to a position in which the pressure applied to the second engaging element is not supplied to the accumulator back pressure control valve, when the upshift command is generated and the detected engine load is approximately equal to its minimum value.

3 Claims, 11 Drawing Sheets

|     | REV/C | HIGH/C | 2-4/B | LOW/C | L&R/B | LOW O.W.C |
|-----|-------|--------|-------|-------|-------|-----------|
| 1st |       |        |       | ◯     | ◌     | ◉         |
| 2nd |       |        | ◯     | ◯     |       |           |
| 3rd |       | ◯      |       | ◯     |       |           |
| 4th |       | ◯      | ◯     |       |       |           |
| Rev | ◯     |        |       |       | ◯     |           |

| SOLENOID / GEAR POSITION | SHIFT SOLENOID A | SHIFT SOLENOID B |
|---|---|---|
| 1st | ○ | ○ |
| 2nd | × | ○ |
| 3rd | × | × |
| 4th | ○ | × |

○ ··· ON (DRAIN CLOSED)
× ··· OFF (DRAIN OPEN)

UPSHIFT CONTROL DEVICE FOR AUTOMATIC TRANSMISSION

BACKGROUND OF THE INVENTION

1. Field of the Invention

The present invention relates to an upshift control device for an automatic transmission, and more particularly to a technique for controlling a back pressure of an accumulator for an engaging element to be released in the course of upshifting.

2. Description of the Prior Art

There is known a shift control device for an automatic transmission as disclosed in Japanese laid-open Patent Publication No. 5-248526. As shown in FIG. 12 (and FIG. 5 of this publication), when the transmission is shifted up from its 3rd-speed gear position to 4th-speed gear position by releasing a low clutch 50 and engaging a band brake 28 (not shown in FIG. 12), a low clutch sequence valve 90 is switched from a supply position in which a back pressure is supplied to a low clutch accumulator 83 of the low clutch 50, to a drain position in which the accumulator is drained, when a difference $\Delta P$ between an accumulator back pressure and a 4th-speed engaging pressure as operating signal pressures becomes equal to a predetermined value (for example, $\Delta P=0.5$ kg/cm2).

In this arrangement, when the transmission is shifted up from the 3rd-speed to 4th-speed gear position while the accelerator pedal is being depressed and the back pressure of the accumulator is at a relatively high level, the low sequence valve 90 is switched to the drain position immediately after a servo piston stroke of the band brake 28 is completed, so that the low clutch pressure is reduced and the 4th-speed engaging pressure is increased in optimum timing.

If the 3-4 upshifting occurs when the accumulator back pressure is at a low level in the conventional shift control device, however, the low clutch sequence valve 90 is switched to the drain position in early timing before completion of the servo piston stroke of the band brake 28, as shown in FIG. 14, to thus bring both the low clutch 50 and band brake 28 into released positions, resulting in racing of the engine.

SUMMARY OF THE INVENTION

It is a first object of the present invention to provide an upshift control device for an automatic transmission wherein the transmission is shifted up to a gear position to be established after upshifting, by releasing an oil pressure from a first engaging element that has been engaged while applying an oil pressure to a second engaging element that has been released, which control device prevents racing of the engine when the transmission is shifted up while the engine load is very small or slightly larger than zero, thus assuring good shifting quality.

It is a second object of the invention to provide the upshift control device as described above, which avoids pull-in of the transmission torque when the vehicle is in the power-off state with the accelerator pedal being released.

It is a third object of the invention to provide the upshift control device as described above, in which a pressure to be applied to the second engaging element is used as an operating signal pressure and is selectively applied to or not applied to an accumulator back pressure control valve.

To accomplish the first object, there is provided according to the present invention an upshift control device for an automatic transmission as shown in FIG. 1, wherein the transmission is shifted up to a first gear position to be established after upshifting, by releasing an oil pressure from a first engaging element "a" that has been engaged in a second gear position established before the upshifting while applying an oil pressure to a second engaging element "b" that has been released in the second gear position, the upshift control device comprising: upshifting determining means "c" for determining whether an upshift command to shift up the transmission is generated; engine load detecting means "d" for detecting an engine load; an accumulator "e" provided in a path leading to the first engaging element "a" that is to be released upon completion of upshifting; an accumulator back pressure control valve "f" using a pressure corresponding to the engine load and a pressure applied to the second engaging element as operating signal pressures, for switching from a supply position for supplying a back pressure of the accumulator "e" to a drain position for draining the accumulator "e" when a difference between the operating signal pressures becomes equal to a predetermined value; a timing valve "h" which is switched between a supply position for supplying the pressure applied to the second engaging element "b" to the accumulator back pressure control valve "f" and a drain position for inhibiting the pressure applied to the second engaging element from being applied to the accumulator back pressure control valve, depending upon to a signal received from a valve control actuator; and accumulator back pressure control means "i" for generating to the valve control actuator "g" a command to inhibit the timing valve "h" from being switched to the drain position, when the upshift command is generated and the engine load detected by the engine load detecting means is approximately equal to a minimum value thereof.

The operation of the upshift control valve constructed as described above will be now described. If the upshift determining means "c" determines that an upshift command is generated to shift up the transmission during running of the vehicle, and the engine load detecting means "d" determines that the engine load is outside the range around its minimum value, the accumulator back pressure control valve "f" is allowed to be switched to the drain position. Thus, the accumulator back pressure control valve "f" is switched from the supply position in which the back pressure is supplied to the accumulator to the drain position in which the accumulator is drained when a difference between the pressure corresponding to the engine load and the pressure applied to the second engaging element "b" as operating signal pressures becomes equal to a predetermined value during upshifting. As a result, the back pressure of the accumulator "e" is removed or released, and the reduction in the pressure released from the first engaging element "a" and the increase in the pressure applied to the second engaging element "b" occur in desired timing, assuring high shifting quality.

If the upshift determining means "c" determines that an upshift command is generated to shift up the transmission during running of the vehicle, and the engine load detecting means "d" determines that the engine load is approximately equal to the minimum value, the accumulator back pressure control means "i" generates to the valve control actuator "g" a command to inhibit the accumulator back pressure control valve "f" from being switched to the drain position, so that the accumulator back pressure control valve "f" is held in the supply position in which the back pressure is supplied to the accumulator "e" during upshifting, whereby the pressure released from the first engaging element "a" is lowered after showing a shelf-pressure characteristic for a sufficiently long time.

Accordingly, when the transmission is shifted up while the engine load is approximately equal to the minimum value and the accumulator back pressure is at a low level, the pressure released from the first engaging element "a" does not start being reduced until the second engaging element "b" achieves its engaging capacity, thereby avoiding occurrence of racing of the engine and resulting pull-in shocks. The racing of the engine would otherwise occur when the accumulator back pressure control valve "f" is switched to the drain position in early timing before completion of the piston stroke, such that both of the first and second engaging elements "a", "b" are brought into released positions.

To accomplish the second object of the invention, the upshift control device as described above may further include power-on/off determining means "j" for determining whether the vehicle is in a power-on state in which an accelerator pedal is being depressed, or in a power-off state in which the accelerator pedal is being released. In this control device, the accumulator back pressure control means "i" generates to the valve control actuator "g" a command to inhibit the accumulator back pressure control valve "f" from being switched to the drain position, when the upshift command is generated and the vehicle is in the power-on state, while the engine load detected by the engine load detecting means is approximately equal to the minimum value.

The operation of the upshift control device as described above will be explained. With the power-on/off determining means "j" thus provided, the accumulator back pressure control valve "f" is allowed to be switched to the drain position when the vehicle is in the power-off state. Thus, the accumulator back pressure control valve "f" is switched to the drain position in early timing, that is, soon after the upshift command is generated, so as to reduce the pressure of the first engaging element "a", thus assuring a good shifting quality during upshifting.

Namely, since the engine does not suffer from racing when the vehicle is in the power-off state, the accumulator back pressure control valve "f" may perform its switching function without causing any problem. In the case where the accumulator back pressure control valve "f" is inhibited from being switched to the drain position and fixed in the position for supplying the back pressure, on the other hand, pull-in of the transmission torque occurs due to a delay in reduction of the engine speed, while making the driver feel that the shifting continues for a prolonged time.

To accomplish the third object of the invention, the valve control actuator "g" may comprise a timing solenoid which generates an oil pressure in response to an ON command and does not generate an oil pressure in response to an OFF command, and the timing valve selectively supplies or stops supplying the pressure applied to the second engaging element to the accumulator back pressure control valve, using the oil pressure generated by the timing solenoid as an operating signal pressure.

The operation will now be explained. The accumulator back pressure control means "i" generates an ON or OFF command to the timing solenoid to thereby control generation of an oil pressure, and the timing valve selectively supplies the pressure applied to the second engaging element "b" to the accumulator back pressure control valve "f" or inhibit the same pressure from being supplied to the control valve "f", using the oil pressure from the above timing solenoid as an operating signal pressure.

Thus, the accumulator back pressure control valve "f" is selectively allowed to perform its normal switching function, or inhibited from being switched to its drain position, depending upon the ON/OFF command generated by the accumulator back pressure control means "i" to the timing solenoid.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

One present embodiment of the present invention in the form of an upshift control device for an automatic transmission will be hereinafter described.

First, there will be schematically described the whole construction of the automatic transmission in which the upshift control device of the present embodiment is employed.

Figure 1:
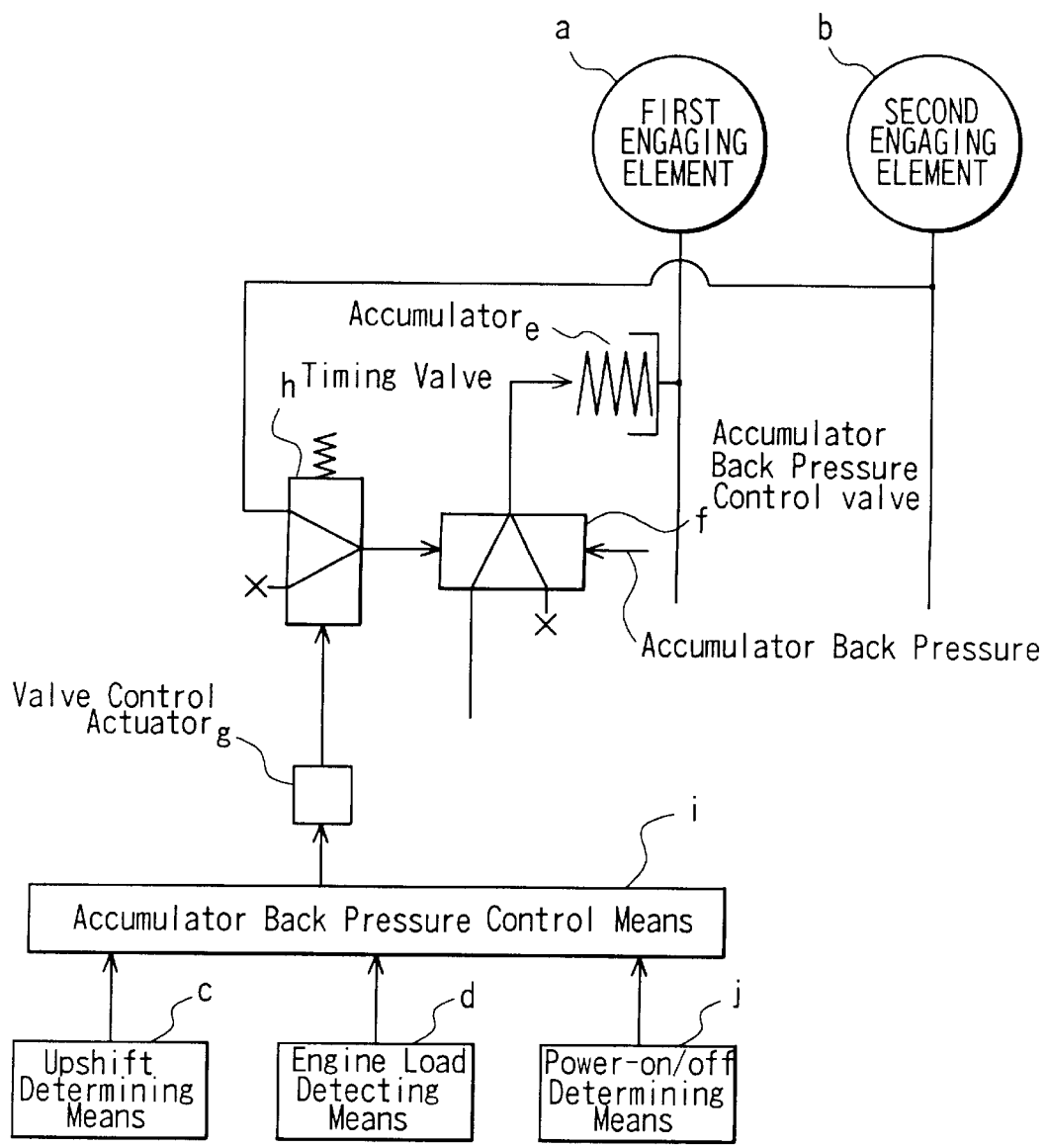
FIG. 1 is a view showing the construction of an upshift control device for an automatic transmission according to the present invention.
Figures 2, 3:
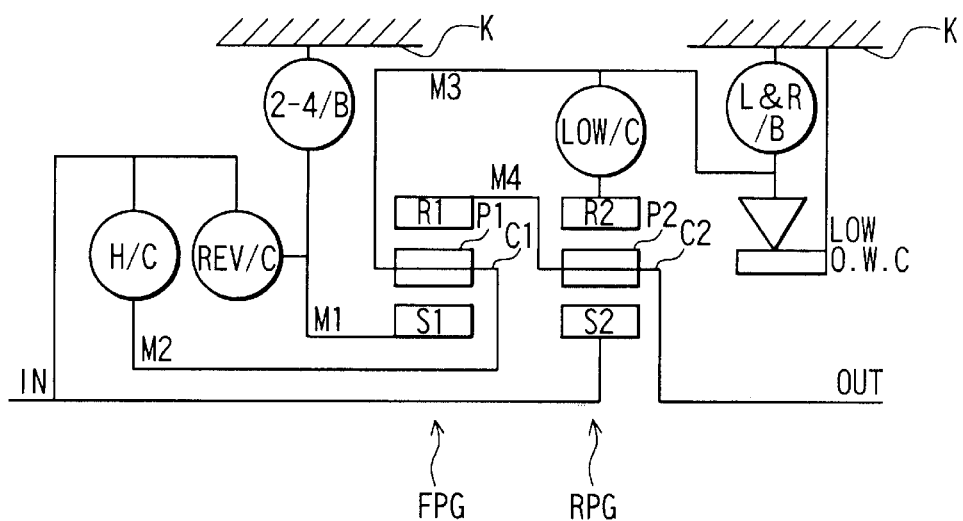
FIG. 2 is a view schematically showing a power transmitting system of the automatic transmission using the hydraulic control device of the first embodiment of the invention.
FIG. 3 is a table showing engaging states of elements of the automatic transmission using the hydraulic control device of the first embodiment.

FIG. 2 is a view schematically showing a power transmitting system of the automatic transmission. In FIG. 2, IN is an input shaft, and OUT is an output shaft, while FPG is a front planetary gear system, and RPG is a rear planetary gear system. The front planetary gear system FPG includes a first sun gear S1, a first ring gear R1, a first pinion P1 and a first pinion carrier C1. The rear planetary gear system RPG includes a second sun gear S2, a second ring gear R2, a second pinion P2 and a second pinion carrier C2.

Engaging elements for establishing forward 4-speed, reverse 1-speed gear positions by using the above-described gear train arrangement are provided which include a reverse clutch REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and low one-way clutch LOW O.W.C.

The first sun gear S1 is connected to the input shaft IN through a first rotary member M1 and the reverse clutch R/C, and also connected to a case K through the first rotary member M1 and the 2-4 brake 2-4/B.

The first carrier C1 is connected to the input shaft IN through a second rotary member M2 and the high clutch H/C, and also connected to the case K through a third rotary member M3 and the low&reverse brake L&R/B. Further, the first carrier C1 is connected to the second ring gear R2 through the third rotary member M3 and the low clutch L/C. The low one-way clutch LOW O.W.C. is disposed in parallel with the low&reverse brake L&R/B.

The first ring gear R1 is directly connected to the second carrier C2 through a fourth rotary member M4, and the output shaft OUT is directly connected to the second carrier C2. The second sun gear S2 is directly connected to the input shaft IN.

This power transmitting system is characterized in that it does not include a one-way clutch for controlling the shift timing so as to eliminate shift shocks upon shifting-down from the 4th-speed to 3rd-speed gear position, and a clutch that is hydraulically engaged and needed for ensuring the effect of engine brakes when the above one-way clutch is employed. Thus, the number of engaging elements is reduced, leading to reduced size and weight of the power transmitting system.

FIG. 3 is a view showing engaged and unengaged states of the engaging elements of the above-described power transmitting system for establishing the forward 4th-speed, reverse 1-speed gear positions.

The 1st-speed gear position is established by hydraulically engaging the low clutch L/C, and hydraulically engaging the low&reverse brake L&R/B (when an engine brake range is selected) or mechanically engaging the low one-way clutch LOW O.W.C. (when the vehicle is accelerated). In this case, the second sun gear S2 is connected to the input shaft IN, and the second ring gear R2 is fixed, while the second carrier C2 is connected to the output shaft OUT.

The 2nd-speed gear position is established by hydraulically engaging the low clutch L/C and the 2-4 brake 2-4/B. In this case, the second sun gear S2 is connected to the input shaft IN, and the first sun gear S1 is fixed, while the second carrier C2 is connected to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the second carrier C2 is connected to the output shaft OUT, so that the transmission gear ratio becomes equal to 1.

The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the second carrier C2 is connected to the output shaft OUT, so as to establish the overdrive gear position.

The reverse gear position is established by hydraulically engaging the reverse clutch REV/C and the low&reverse brake L&R/B. In this case, the first and second sun gears S1, S2 are connected to the input shaft IN, and the first carrier C1 is fixed, while the second carrier C2 is connected to the output shaft OUT.

The 2-4 brake 2-4/B is a multiple-disc brake that is constructed similarly to a multiple-disc clutch.

Figure 4:
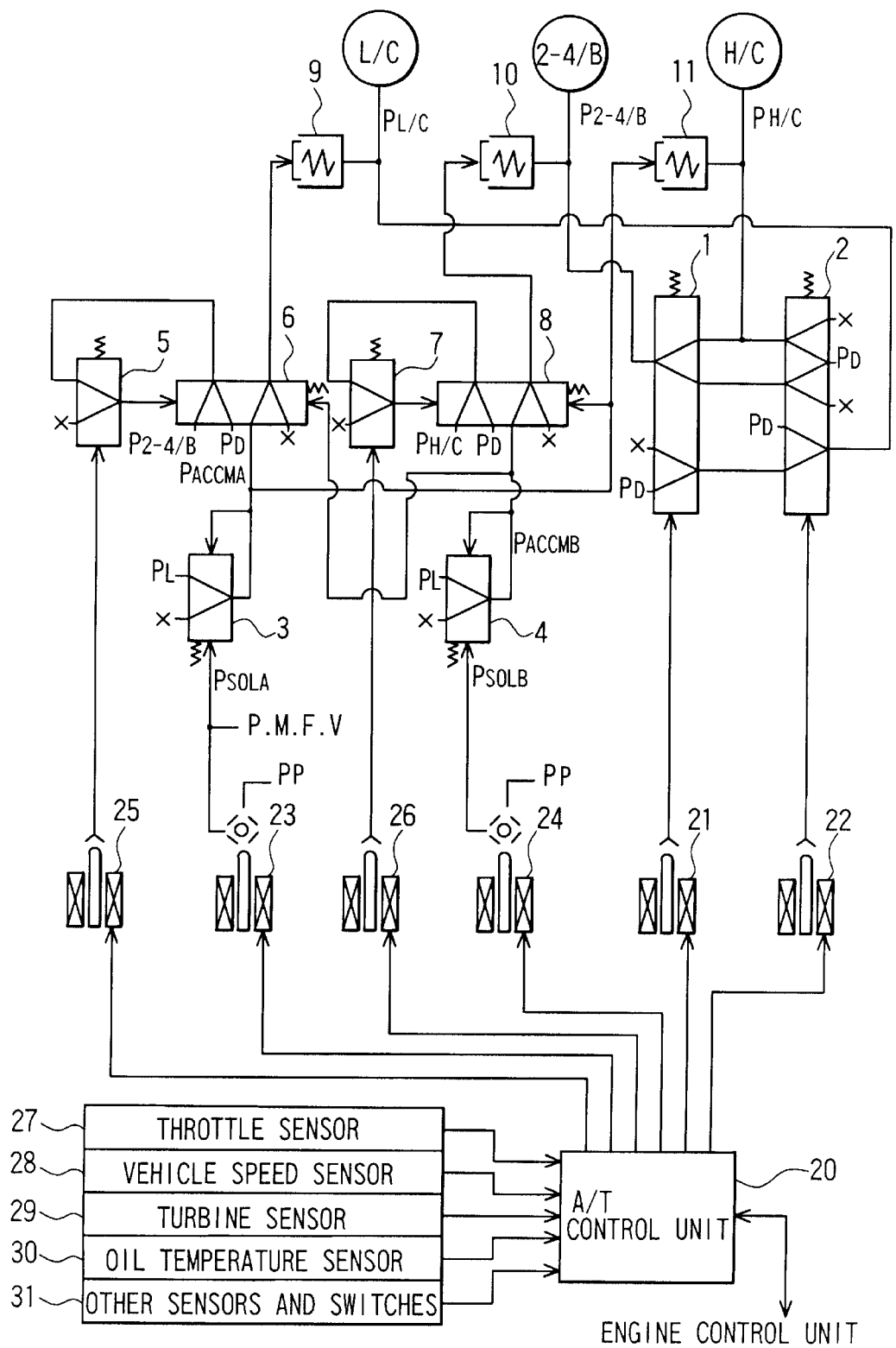
FIG. 4 is a diagram showing the whole control system including a hydraulic control portion and an electronic control portion of the downshift control device of the first embodiment.

FIG. 4 is a control system diagram showing a control valve portion, an electronic control portion, and engaging elements for automatically shifting the transmission to establish one of the above-indicated 1st-speed to 4th-speed gear positions in the D (drive) range. In FIG. 4, the low clutch L/C, 2-4 brake 2-4/B and high clutch H/C are provided as the engaging elements.

In the control valve portion of FIG. 4, there are provided a shift valve (A) 1, shift valve (B) 2, accumulator control valve (A) 3, accumulator control valve (B) 4, low clutch timing valve 5, low clutch sequence valve 6, 2-4 brake timing valve 7, 2-4 brake sequence valve 8, low clutch accumulator 9, 2-4 brake accumulator 10 and high clutch accumulator 11.

The shift valve (A) 1 and shift valve (B) 2 are adapted to switch oil paths to establish each of the 1st-speed to 4th-speed (overdrive) gear positions according to the operations of a shift solenoid (A) 21 and a shift solenoid (B) 22, respectively.

The accumulator control valve (A) 3 reduces a line pressure PL depending upon the level of a solenoid pressure PSOLA produced by a line pressure duty solenoid 23, so as to produce an accumulator control pressure (A) PACCMA. The solenoid pressure PSOLA produced by the line pressure duty solenoid 23 is also led to a pressure modifier valve adapted to produce a modifier pressure that serves as a signal pressure for the line pressure PL produced by a pressure regulator valve (not shown).

The accumulator control valve (B) 4 reduces the line pressure PL depending upon the level of a solenoid pressure PSOLB produced by a 2-4/B duty solenoid 24, so as to produce an accumulator control pressure (B) PACCMB.

The low clutch timing valve 5 is a switch valve that drains a signal pressure oil path when a low clutch timing solenoid 25 is OFF, and produces an oil pressure for communication of the signal pressure oil path when the solenoid 25 is ON. The low clutch sequence valve 6 is adapted to control the back pressure of the low clutch accumulator 9 upon shifting-up to the 4th-speed gear position or shifting-down from the 4th-speed gear position.

The 2-4 brake timing valve 7 is a switch valve that drains a signal pressure oil path when a 2-4 brake timing solenoid 26 is OFF, and produces an oil pressure for communication of the signal pressure oil path when the solenoid 26 is ON. The 2-4 brake sequence valve 8 is adapted to control the back pressure of the 2-4 brake accumulator 10 upon shifting-up to the 3rd-speed gear position or shifting-down from the 3rd-speed gear position.

The low clutch accumulator 9 has a back pressure chamber to which the accumulator control pressure (A) PACCMA is applied through the low clutch sequence valve 6, so as to smoothly engage and release the low clutch L/C. The 2-4 brake accumulator 10 has a back pressure chamber to which the accumulator control pressure (B) PACCMB is applied through the 2-4 brake sequence valve 8, so as to smoothly engage and release the 2-4 brake 2-4/B. The high clutch accumulator 11 has a back pressure chamber to which the accumulator control pressure (A) PACCMA is directly applied, so as to smoothly engage and release the high clutch H/C.

The electronic control portion of FIG. 4 includes shift solenoid (A) 21, shift solenoid (B) 22, line pressure duty solenoid 23, 2-4/B duty solenoid 24, low clutch timing solenoid 25 and 2-4/B timing solenoid 26, as actuators for controlling oil pressures according to drive commands generated by an A/T control unit 20.

The A/T control unit 20 receives as input information various signals from various sensors, such as a throttle sensor 27 for detecting the throttle opening of a throttle valve, a vehicle speed sensor 28 for detecting the vehicle speed, a turbine sensor 29 for detecting the rotating speed of a turbine runner, oil temperature sensor 30 for detecting the oil temperature, and other sensors and switches 31.

Figures 5, 6:
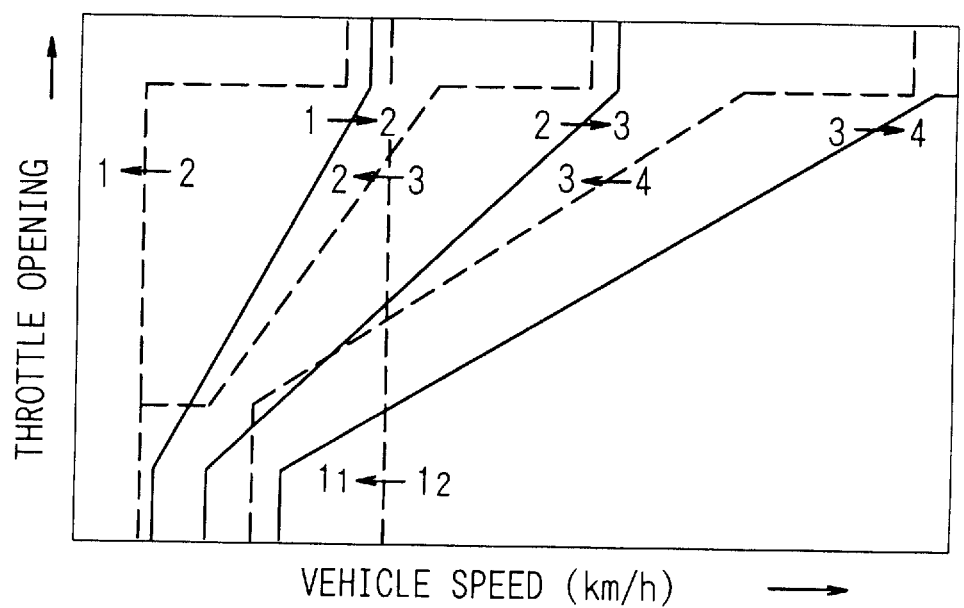
FIG. 5 is a table showing operated states of shift solenoids of the hydraulic control device of the first embodiment.
FIG. 6 is a graph showing one example of gear change point characteristics employed by the hydraulic control device of the first embodiment.

To perform shift control for automatically shifting the transmission from one of the 1st-speed to 4th-speed gear positions to another in the D (drive) range, a gear change command is first generated based on the graph of FIG. 6 indicating gear change points in relation to the detected throttle opening and vehicle speed, when the current point (relationship between the throttle opening and vehicle speed) on the graph passes one of upshifting and downshifting lines, and the gear position to which the transmission should be shifted is determined by this gear change command. To establish the thus determined gear position, the A/T control unit 20 generates ON- or OFF-command to each of the shift solenoid (A) 21 and shift solenoid (B) 22 according to the table of FIG. 5 indicating operated states of the shift solenoids.

There will be next explained the operation of the present embodiment.

Electronic Control Operation upon 2-3 Upshifting

Figure 7:
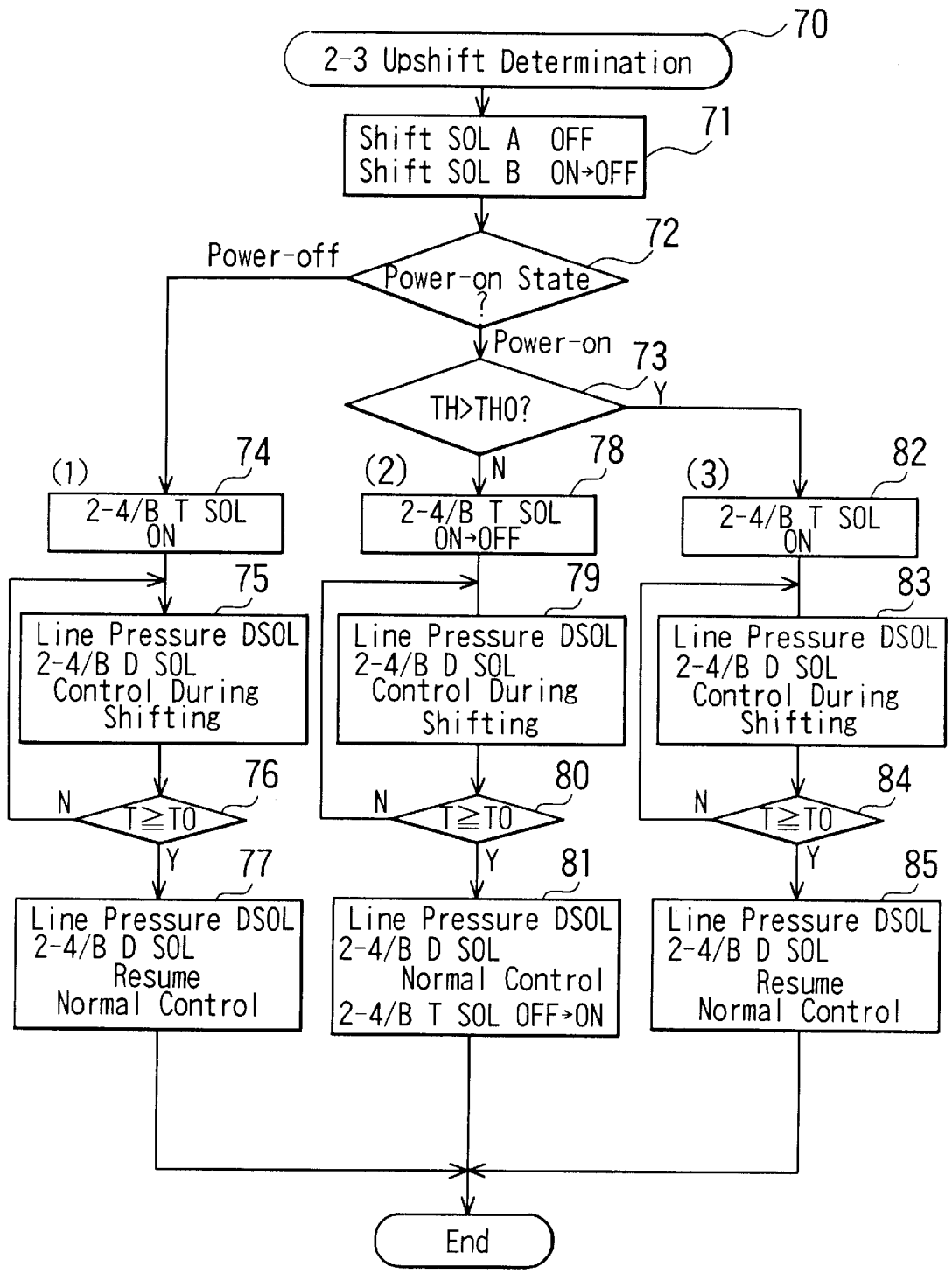
FIG. 7 is a flow chart showing the flow of 2nd-speed to 3rd-speed upshift control performed by an A/T control unit of the first embodiment.
Figure 8A:
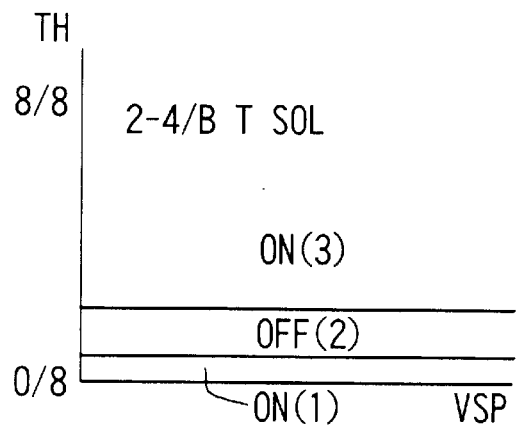
FIGS. 8A–8D are maps used for determining the power-on/off state of the vehicle and the engine load at the same time.
Figure 8B:
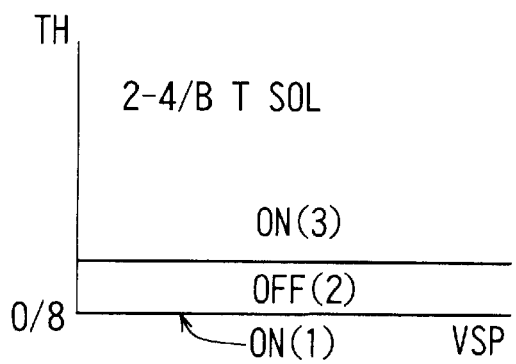
Figure 8C:
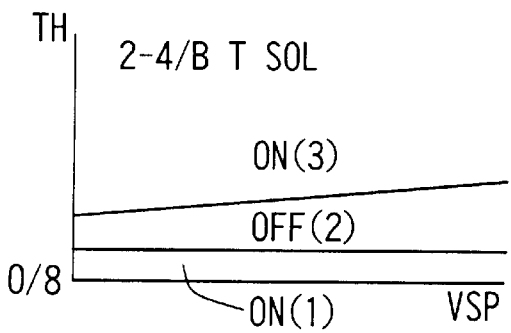
Figure 8D:
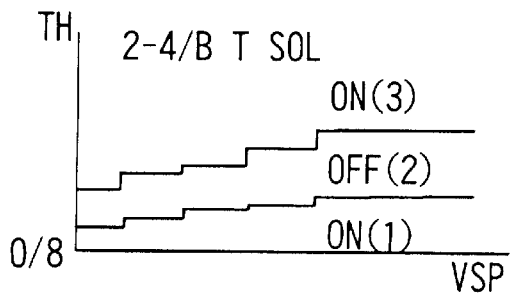

FIG. 7 is a flow chart showing the flow of the upshift control performed by the A/T control unit 20 when the transmission is shifted up from the 2nd-speed to 3rd-speed gear position, in which control the 2-4 brake 2-4/B (corresponding to the first engaging element "a") is released and the high clutch H/C (corresponding to the second engaging element "b") is engaged. This control flow corresponds to the accumulator back pressure control means "i".

Initially, in step 70 of FIG. 7, it is determined whether the transmission is to be shifted up from the 2nd-speed to 3rd-speed gear position. An affirmative decision (YES) is obtained in this step when the current point (relationship between the throttle opening and the vehicle speed) on the graph of FIG. 6 indicating gear change points passes the 2-3 upshifting line, and a 2-3 upshift command is generated. (This step corresponds to upshift determining means "c".) When it is determined that the 2-3 upshift command is generated, a timer value T representing the time elapsed after generation of the 2-3 upshift command starts being increased, and required input information, such as a throttle opening TH, is read in. In step 71, an OFF command is kept being generated to the shift solenoid (A) 21, and a command to the shift solenoid (B) 22 is switched from ON to OFF.

In step 72, it is determined whether the vehicle is in a power-on state or a power-off state. The power-off state is determined when the detected throttle opening TH is smaller than its minimum value that is close to zero, for example, and the power-on state is determined in the other situation. If the power-on state is determined in step 72, step 73 is then executed to determine whether the throttle opening TH detected by the throttle sensor 27 (corresponding to engine load detecting means "d") is greater than a predetermined throttle opening TH0, e.g., 1/16, which is the minimum value that is slightly larger than zero.

According to the determinations in step 72 and 73, power-off control (a) of step 74 through step 77 is performed if step 72 determines that the vehicle is in the power-off state, and accumulator back pressure drain inhibit control (2) of step 78 through step 81 is performed when the vehicle is in the power-on condition with the throttle opening being substantially equal to the above-described minimum value, while accumulator back pressure timing control (3) of step 82 through step 85 is performed when the vehicle is in the power-on condition with the throttle opening being in a relatively small to large opening range.

While the power-on/off state and the engine load are determined separately in steps 72, 73 in the present embodiment, maps having the throttle opening TH and the vehicle speed VSP as the ordinate and abscissa as shown in FIGS. 8A–8D may be prepared, so as to simultaneously determine which one of the power-on control (1), accumulator back pressure drain inhibit control (2) and accumulator back pressure timing control (3) is to be implemented. It is to be noted that the determination using the maps of FIGS. 8A and 8B only depends on the throttle opening TH, while the determination using the maps of FIGS. 8C and 8D depends both on the vehicle speed VSP and the throttle opening TH such that the threshold value of the throttle opening TH increases as the vehicle speed VSP increases.

Figure 9:
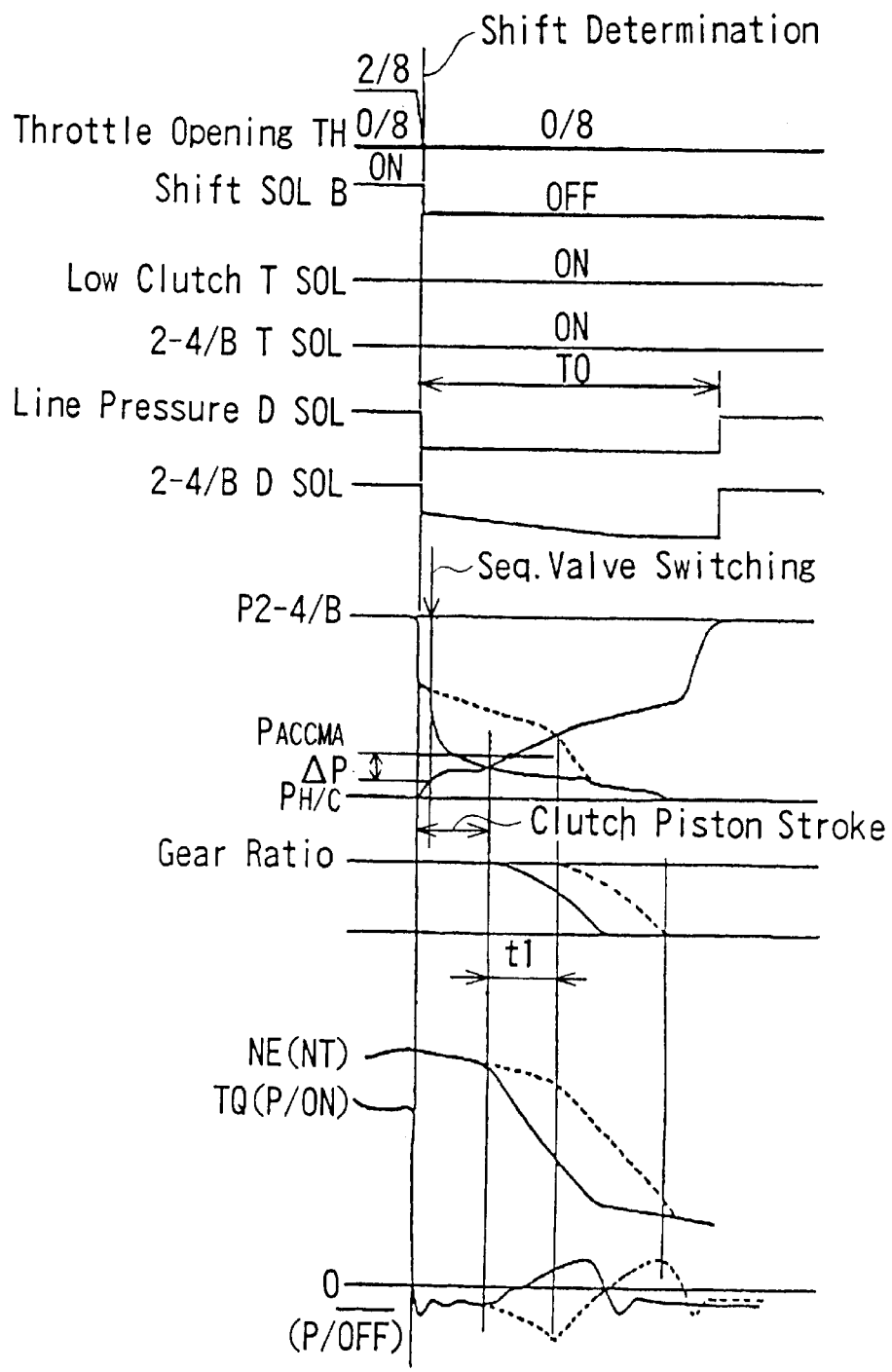
FIG. 9 is a time chart showing respective transient characteristics of control commands, oil pressure, gear ratio, transmission torque and others during the 2nd-speed to 3rd-speed shift-up operation while the vehicle is in the power-off state.

In step 74, an ON command is generated to the 2-4/B timing solenoid 26. In step 75, an accumulator pressure control (as shown in FIG. 9) during shifting is effected with respect to the line pressure duty solenoid 23 and 2-4/B duty solenoid 24. In step 76, it is determined whether the current timer value T is equal to or larger than a predetermined timer value T0 that represents completion of the shift operation. If an affirmative decision (YES) is obtained in step 76, step 77 is then executed to generate a command to resume normal control of the line pressure duty solenoid 23 and 2-4/B duty solenoid 24 which have been operated under the accumulator pressure control during shifting.

Figure 10:
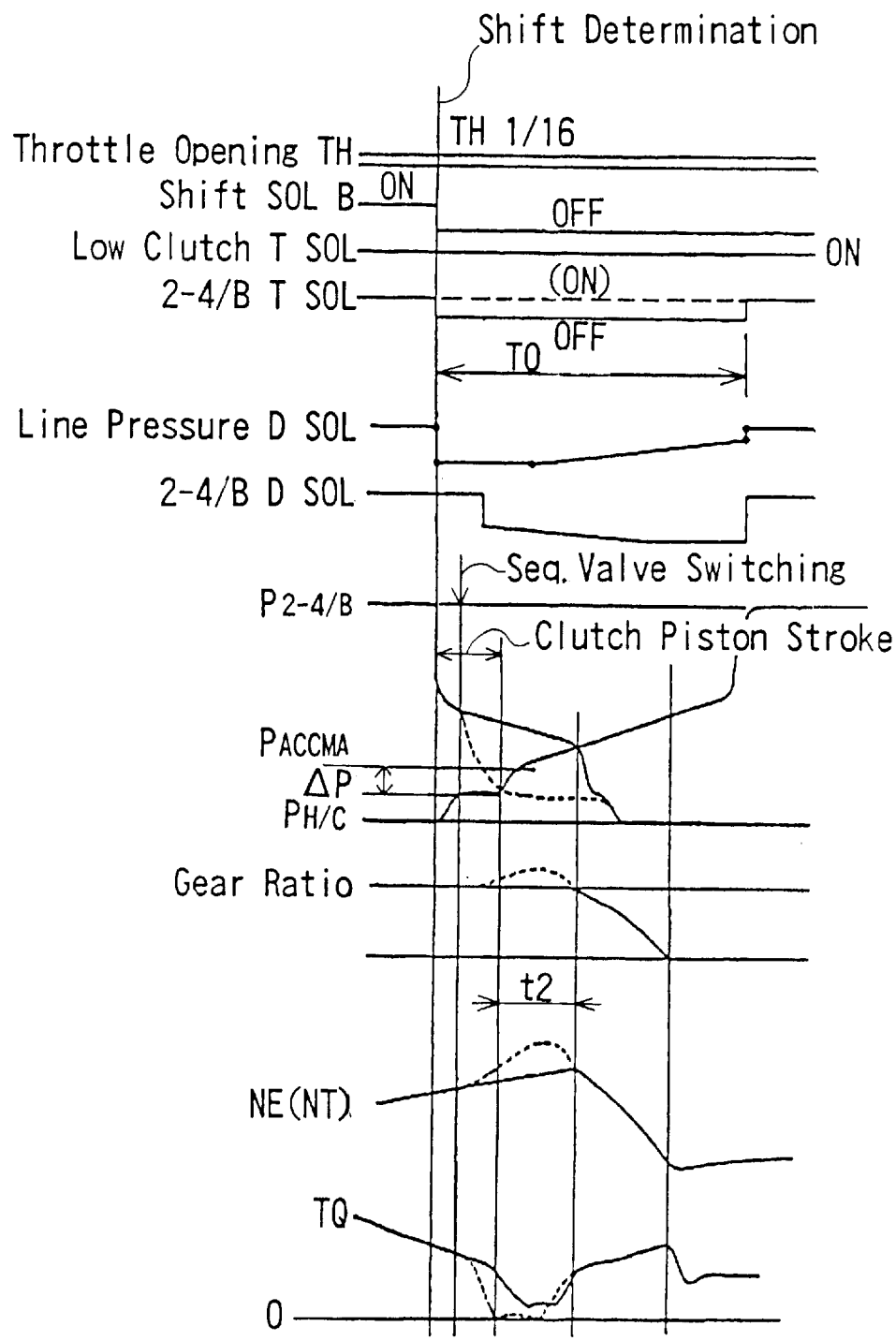
FIG. 10 is a time chart showing respective transient characteristics of control commands, oil pressure, gear ratio, transmission torque and others during the 2nd-speed to 3rd-speed shift-up operation while the vehicle is in the power-on state and the throttle opening is close to the minimum value.

In step 78, an OFF command is generated to the 2-4/B timing solenoid 26. In step 79, an accumulator pressure control (as shown in FIG. 10) during shifting is effected with respect to the line duty solenoid 23 and 2-4/B duty solenoid 24. In step 80, it is determined whether the current timer value T is equal to or larger than the predetermined timer value T0 that represents completion of the shift operation. If an affirmative decision (YES) is obtained in step 80, step 81 is executed to generate a command to resume normal control of the line pressure duty solenoid 23 and 2-4/B duty solenoid 24 which have been operated under the accumulator pressure control during shifting, and generate an ON command to the 2-4/B timing solenoid 26.

Figure 11:
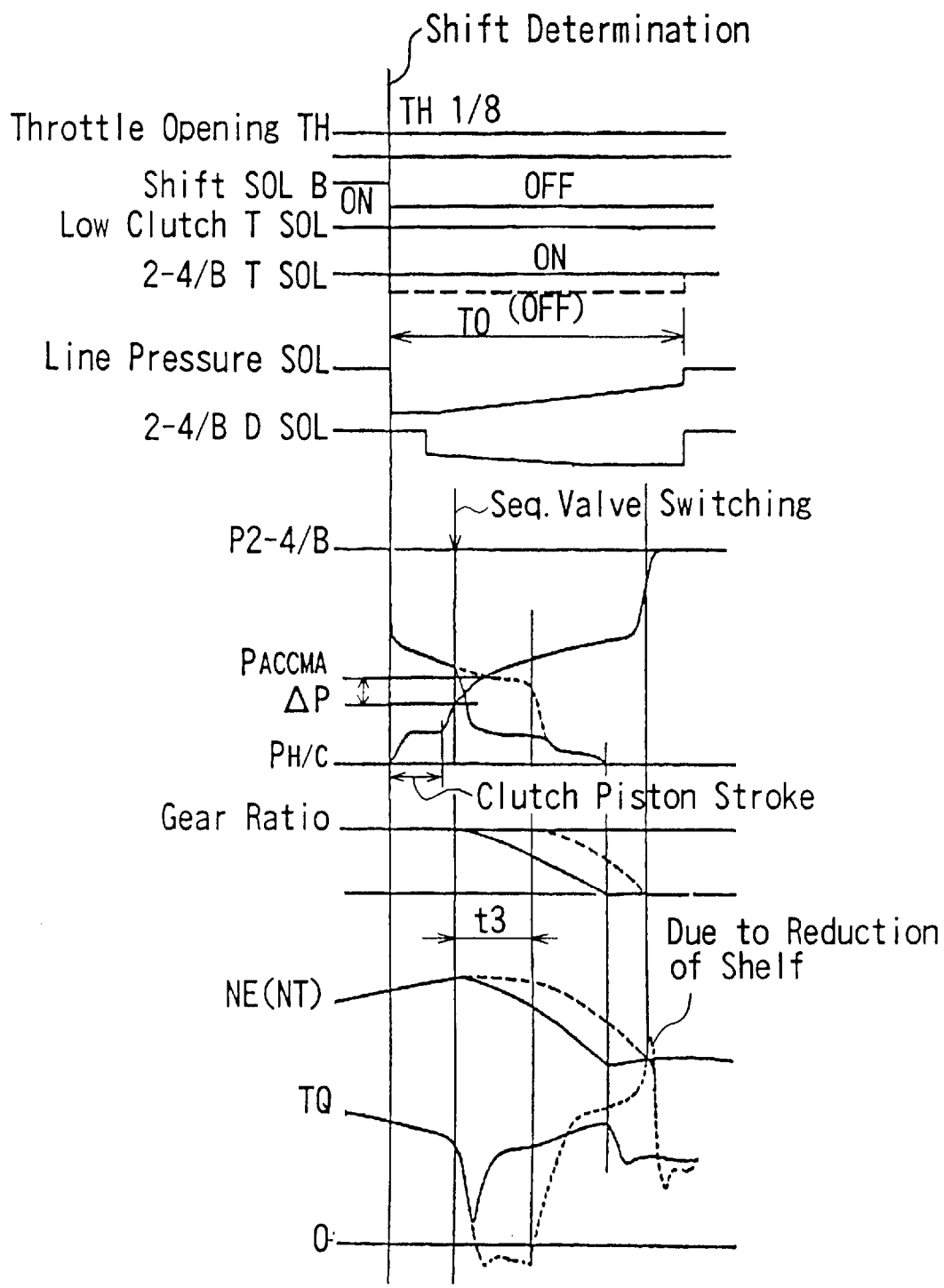
FIG. 11 is a time chart showing respective transient characteristics of control commands, oil pressure, gear ratio, transmission torque and others during the 2nd-speed to 3rd-speed shift-up operation while the vehicle is in the power-on state and the throttle opening is in a small to large opening range.
Figure 12:
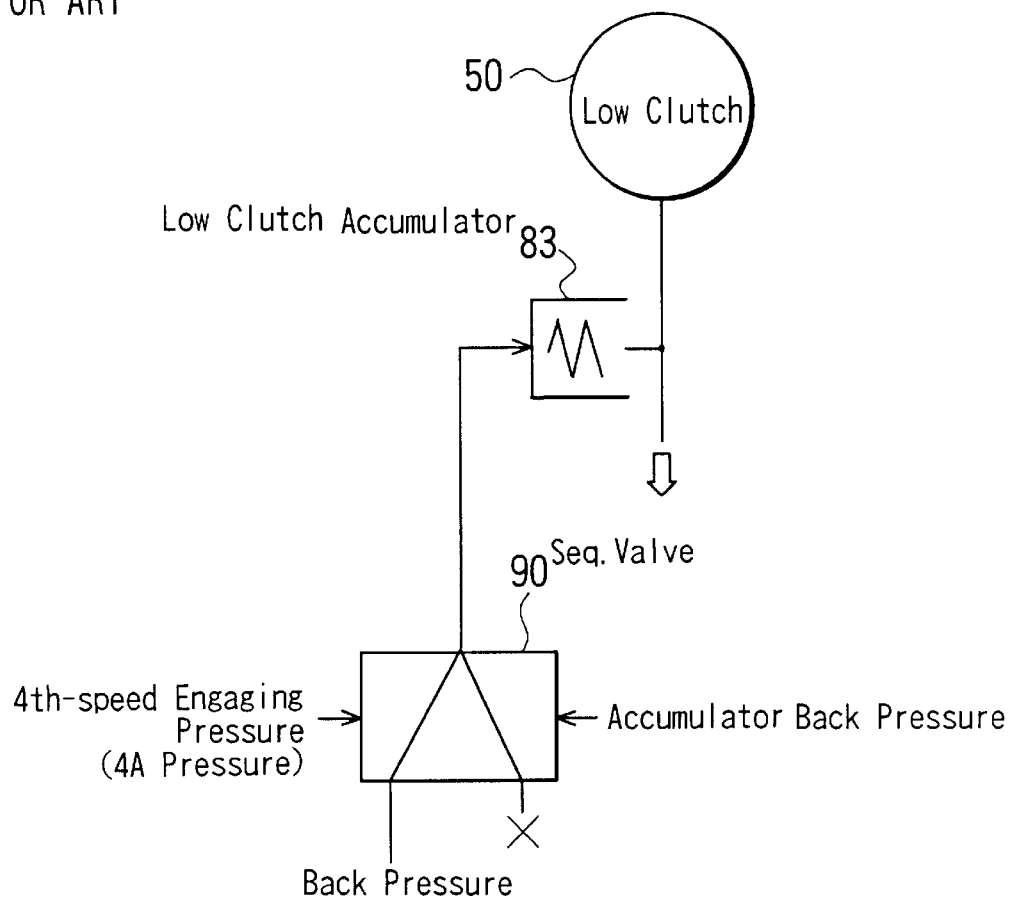
FIG. 12 is a schematic view showing a conventional upshift control device for an automatic transmission.
Figure 13:
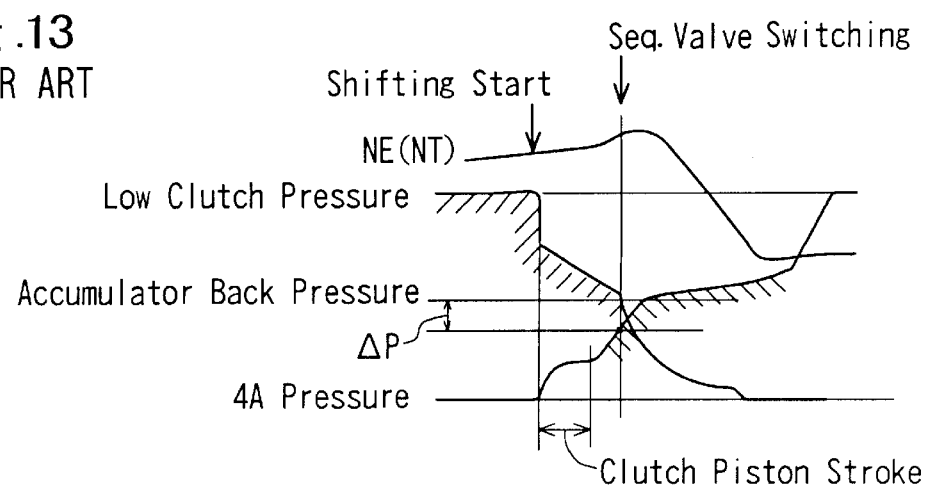
FIG. 13 is a time chart showing transient characteristics of engine speed and clutch pressure during 2nd-speed to 3rd-speed upshifting while the vehicle is in the power-on state with the throttle opening being in a small to large opening range.
Figure 14:
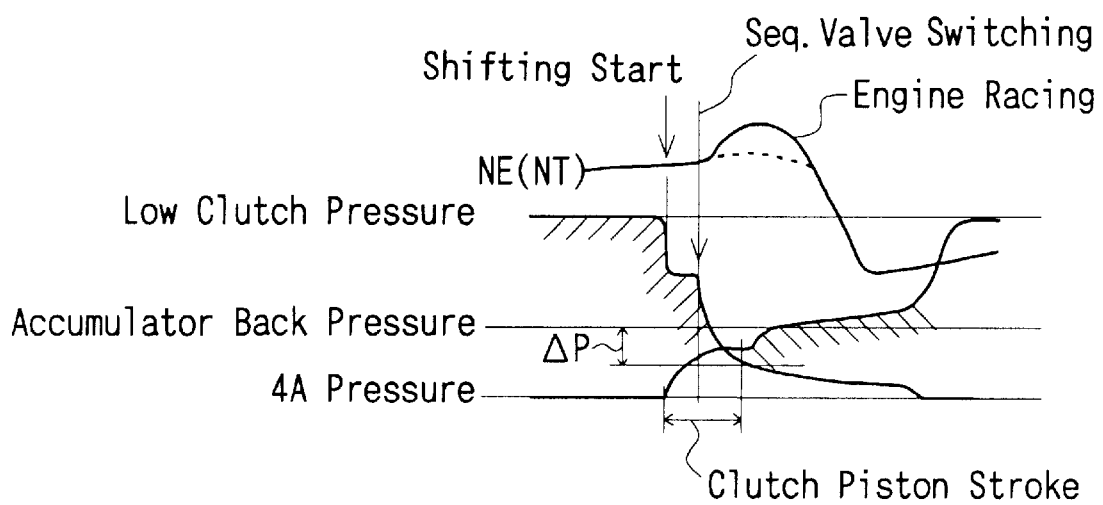
FIG. 14 is a time chart showing transient characteristics of engine speed and clutch pressure during 2nd-speed to 3rd-speed upshifting while the vehicle is in the power-on state with the throttle opening being close to the minimum value.

In step 82, an ON command is generated to the 2-4/B timing solenoid 26. In step 83, an accumulator pressure control (as shown in FIG. 11) during shifting is effected with respect to the line pressure duty solenoid 23 and 2-4/B duty solenoid 24. In step 84, it is determined whether the current timer value T is equal to or larger than the predetermined timer value T0 that represents completion of the shift operation. If an affirmative decision (YES) is obtained in step 84, step 85 is executed to generate a command to resume normal control of the line pressure duty solenoid 23 and 2-4/B duty solenoid 24 which have been operated under the accumulator pressure control during shifting. During the 2-3 shift-up operations as described above, an ON command is kept generated to the low clutch timing solenoid 25.

Control Operation in Power-off Condition

Referring to a time chart as shown in FIG. 9, a 2-3 upshift control operation will be now explained.

If a 2-3 upshift command is generated when the accelerator pedal that has been depressed is released (TH changes from 2/8 to 0/8) or while the accelerator pedal is held in a released position (TH remains 0/8), a command to the shift solenoid (B) 22 is switched from ON to OFF, and the D (drive) range pressure is supplied to the oil path to the high clutch H/C which has been connected to a drain, and the oil path to the 2-4 brake 2-4/B to which the D (drive) range pressure has been supplied is connected to a drain.

The back pressure of the accumulator 11 of the high clutch H/C is controlled by the line pressure duty solenoid 23 that produces the accumulator control pressure (A) PACCMA, and the back pressure of the accumulator 10 of the 2-4 brake 2-4/B is controlled by the 2-4/B duty solenoid 24 that produces the accumulator control pressure (B) PACCMB, and the 2-4/B timing solenoid 26 for switching the 2-4/B timing valve 7.

To control the back pressure of the accumulator 11 of the high clutch H/C, the line pressure duty solenoid 23 is driven with a low duty ratio so that a low level of accumulator back pressure is supplied to the high clutch accumulator 11, as shown in FIG. 9. As a result, the high clutch pressure PH/C gradually increases to the level of the accumulator back pressure after a lapse of a clutch piston stroke period, then shows a shelf-pressure characteristic for a period of time corresponding to the capacity of the high clutch accumulator 11, and then suddenly increases to the level of the line pressure when a piston of the accumulator reaches its stroke end, as shown in FIG. 9.

To control the back pressure of the accumulator 10 of the 2-4 brake 2-4/B, on the other hand, the ON command is kept being generated to the 2-4/B timing solenoid 26, whereby the 2-4/B timing valve 7 is held in a position for supplying the high clutch pressure PH/C as an operating signal pressure to the 2-4 brake sequence valve 8 (corresponding to accumulator back pressure control valve "f"). As a result, the 2-4 brake sequence valve 8 that has supplied the accumulator control pressure (B) PACCMB to the 2-4 brake accumulator 10 (corresponding to accumulator "e") is switched to a position in which the accumulator 10 is connected to a drain, when a difference Δ P between the accumulator control pressure (A) PACCMA and the high clutch pressure PH/C becomes equal to a predetermined value. Since the accumulator control pressure (A) PACCMA is relatively low when the vehicle is in the power-off state, the difference Δ P between the accumulator control pressure (A) PACCMA and the high clutch pressure PH/C becomes equal to the predetermined value in an early period of shifting, namely, soon after the shift-up command is generated, and the back pressure of the 2-4 brake accumulator 10 is drained in this early period. Thus, the 2-4 brake pressure P2-4/B is rapidly lowered at the same time that the back pressure of the accumulator 10 is drained in the middle of the clutch piston stroke period, as shown in FIG. 9.

In the above arrangement, the gear ratio is lowered and the shift action progresses in an early period of shifting soon after the shift command is generated, and the engine speed NE is lowered in this early period, while the transmission torque TQ is gradually increased with the change in the gear ratio, and then lowered to some extent. These characteristics assure high shifting quality when the transmission is shifted up from the 2nd-speed to 3rd-speed gear position.

Thus, since the engine does not suffer from racing in the power-off state of the vehicle, the 2-4 brake sequence valve 8 may be switched between the position for draining the accumulator 10 of the 2-4 brake 2-4/B and the position for supplying the accumulator control pressure (B) PACCMB to the accumulator 10, without causing any problem. In the case where the 2-4 brake sequence valve 8 is inhibited from being switched to the drain side and fixed in the position for supplying the back pressure, on the other hand, the 2-4 brake pressure P2-4/B changes as indicated by a dotted line in FIG. 9, and the reduction of the engine speed NE is delayed by time "t1" as shown in FIG. 9, resulting in pull-in of the transmission torque TQ, and a delay in the reduction of the gear ratio that causes the driver to feel that the shifting operation lasts for a prolonged time.

Control Operation for Inhibiting Drain of Accumulator Back Pressure

Referring to a time chart as shown in FIG. 10, a 2-3 upshift control operation when the vehicle is in the power-on state with a very small or minimum throttle opening will be now explained.

If a 2-3 upshift command is generated while the accelerator pedal is kept slightly depressed (TH remains 1/16), a command to the shift solenoid (B) 22 is switched from ON to OFF, and the D (drive) range pressure is supplied to the oil path to the high clutch H/C which has been connected to a drain, and the oil path to the 2-4 brake 2-4/B to which the D (drive) range pressure has been supplied is connected to the drain.

To control the back pressure of the accumulator 11 of the high clutch H/C, the duty ratio with which the line pressure duty solenoid 23 is driven is held at a low level in the initial period of shifting, and then increased with a gentle slope, as shown in FIG. 10, so as to supply the accumulator back pressure thus controlled to the high clutch accumulator 11. As a result, the high clutch pressure PH/C increases to the level of the accumulator back pressure after a lapse of a clutch piston stroke period, then shows a shelf-pressure characteristic with a small slope of increase for a period of time corresponding to the capacity of the high clutch accumulator 11, and then rapidly increases to the level of the line pressure when a piston of the accumulator reaches its stroke end, as shown in FIG. 10.

To control the back pressure of the accumulator 10 of the 2-4 brake 2-4/B, on the other hand, an OFF command is generated to the 2-4/B timing solenoid 26 at the same time that the 2-3 upshift command is generated, whereby the 2-4/B timing valve 8 is switched from a position for supplying the high clutch pressure PH/C as an operating signal pressure to the 2-4 brake sequence valve 8, to a position for disconnecting the valve 8 from the high clutch pressure PH/C. As a result, only the accumulator control pressure (A) PACCMA is applied to the 2-4 brake sequence valve 8 to the left as viewed in FIG. 4, so that the back pressure of the 2-4 brake accumulator 10 is inhibited from being drained, and the accumulator control pressure (B) PACCMB is kept being supplied to the 2-4 brake accumulator 10. Namely, switching of the 2-4 brake sequence valve 8 does not occur even when a difference Δ P between the accumulator control pressure (A) PACCMA and the high clutch pressure PH/C becomes equal to a predetermined value. Therefore, the 2-4 brake pressure P2-4/B maintains its shelf-pressure characteristics even after a lapse of the clutch piston stroke period, as shown in FIG. 10, and is then lowered with an increase in the high clutch pressure PH/C.

When the upshifting occurs when the throttle opening is very small and the accumulator control pressure (A) PACCMA is at a relatively low level, the pressure released from the 2-4 brake 2-4/B is not reduced until the high clutch H/C achieves the engaging capacity, thereby avoiding an increase in the engine speed NE due to its racing, and pull-in of the transmission torque TQ caused by the racing of the engine, thus assuring a high shifting quality.

If the 2-4 brake sequence valve 8 retains its switching function, this valve 8 is switched to the position for draining the accumulator back pressure in early timing before the piston stroke is completed, as indicated by a dotted line in FIG. 10, whereby both of the 2-4 brake 2-4/B and high clutch H/C are placed in released states (neutral states). In this case, the engine suffers from racing in the period "t2" starting from completion of the clutch piston stroke and ending when the high clutch H/C reaches its engaging capacity, and pull-in shocks occur due to the racing of the engine.

Operation for Controlling Timing of Accumulator Back Pressure

Referring to a time chart as shown in FIG. 11, a 2-3 upshift control operation to be effected when the vehicle is in the power-on state and the throttle valve is in a small to large opening range will be now explained.

If a 2-3 upshift command is generated while the accelerator pedal is being depressed (TH remains 1/8), for example, a command to the shift solenoid (B) 22 is switched from ON to OFF, and the D (drive) range pressure is supplied to the oil path to the high clutch H/C which has been connected to a drain, and the oil path to the 2-4 brake 2-4/B to which the D (drive) range pressure has been supplied is connected to the drain.

To control the back pressure of the accumulator 11 of the high clutch H/C, the duty ratio with which the line pressure duty solenoid 23 is driven is held at a low level in the initial period of shifting, and is then increased with a gentle slope as shown in FIG. 11, so as to supply the controlled accumulator back pressure to the high clutch accumulator 11. As a result, the high clutch pressure PH/C increases to the level of the accumulator back pressure after a lapse of a clutch piston stroke period, then shows a shelf-pressure characteristic with a small slope of increase for a period of time corresponding to the capacity of the high clutch accumulator 11, and then rapidly increases to the level of the line pressure when a piston of the accumulator reaches its stroke end, as shown in FIG. 11.

To control the back pressure of the accumulator 10 of the 2-4 brake 2-4/B, on the other hand, an ON command is kept being generated to the 2-4/B timing solenoid 26, so that the 2-4/B timing valve 7 is placed in a position for supplying the high clutch pressure PH/C as an operating signal pressure to the 2-4 brake sequence valve 8. When a difference Δ P between the accumulator control pressure (A) PACCMA and the high clutch pressure PH/C becomes equal to a predetermined value, therefore, the 2-4 brake sequence valve 8 is switched from a position for supplying the accumulator control pressure (B) PACCMB to the accumulator 10 to a position for draining the accumulator 10. Since the level of the accumulator control pressure (A) PACCMA changes with the size of the throttle opening TH when the vehicle is in the power-on state while the throttle opening TH is not very small, namely, while the throttle valve is in the low to high opening range, the difference Δ P between the accumulator control pressure (A) PACCMA and the high clutch pressure PH/C becomes equal to the predetermined value after the clutch piston stroke period elapses from the time of generation of the shift command, and the back pressure of the 2-4 brake accumulator 10 is thus drained. Accordingly, the 2-4 brake pressure P2-4/B is suddenly lowered as shown in FIG. 11 as the back pressure of the accumulator 10 is drained after the lapse of the clutch piston stroke period.

In the above arrangement, the gear ratio is lowered and the shift action progresses in the optimum period immediately after the clutch piston stroke period elapses since the shift command is generated, and the engine speed NE is also lowered as the 2-4 brake pressure P2-4/B is lowered. The transmission torque TQ varies with relatively small fluctuations, though it is temporarily reduced immediately after switching of the 2-4 brake sequence valve 8. Thus, desired shifting characteristics can be obtained by switching the 2-4 brake sequence valve 8 as described above, thus assuring a high shifting quality during the shift-up operation.

In the case where the switching of the 2-4 brake sequence valve 8 is inhibited during the 2nd-speed to 3rd-speed upshifting while the vehicle is in the power-on condition with the throttle valve being in the low to high opening range, reduction of the shelf pressure (steady-state level) of the 2-4 brake pressure P2-4/B is delayed until the time "t3" elapses from the point of time when the 2-4 brake sequence valve 8 is to be switched. As a result, pull-in of the transmission torque TQ may occur during this delay time due to an increase in the engine speed NE, and in some cases, the shift operation may be terminated later than termination of the shelf pressure of the accumulator, resulting in shocks.

Effects of the present embodiment will be described.

(1) The upshift control device of the present embodiment is provided with the 2-4 brake sequence valve 8 which is switched from the position in which the accumulator control pressure (B) PACCMB is supplied to the 2-4 brake accumulator 10 to the position in which the accumulator 10 is drained, when a difference Δ P between the accumulator control pressure PACCMA and the high clutch pressure PH/C to the high clutch H/C as operating signal pressures becomes equal to the predetermined value. The A/T control unit 20 of the present control device generates a command (OFF command) to the 2-4/B timing solenoid 26 so as to inhibit switching of the 2-4 brake sequence valve 8 to the drain side, if the throttle opening TH detected by the throttle sensor 27 is determined to be very small when the 2-3 upshift command is generated. Thus, the present control device can prevent racing of the engine, thus assuring high shifting quality, when the transmission is shifted up from the 2nd-speed to 3rd-speed position while the throttle opening is very small or slightly larger than zero.

(2) In the upshift control device of the present embodiment, it is determined whether the vehicle is in the power-on state with the accelerator pedal being depressed, or in the power-off state with the accelerator pedal being released, and, if the vehicle is in the power-on state when a 2-3 upshift command is generated, and the throttle opening TH detected by the throttle sensor 27 is determined to be very small or slightly larger than zero, a command (OFF command) to inhibit switching of the 2-4 brake sequence valve 8 to the drain side is generated to the 2-4/B timing solenoid 26. When the vehicle is in the power-off state with the accelerator pedal being released, therefore, the 2-4 brake sequence valve 8 can be switched between the pressure-supply side and the drain side, thus avoiding pull-in of the transmission torque in the power-off state.

(3) The valve control actuator comprises the 2-4/B timing solenoid 26 adapted to generate an oil pressure in response to an ON command and not to generate an oil pressure in response to an OFF command, and the 2-4/B timing valve 7 that selectively supply or stop the high clutch pressure PH/C, using the oil pressure from the 2-4/B timing solenoid 26 as an operating signal pressure. With the 2-4/B timing valve 7 selectively allowing or inhibiting the supply of the high clutch pressure PH/C as an operating signal pressure of the 2-4 brake sequence valve 8, the 2-4 brake sequence valve 8 operates in a selected one of two modes, that is, in a switchable mode in which the valve 8 can be surely switched between the pressure supply side and the drain side, and in a drain inhibit mode in which the valve 8 is inhibited from being switched to the drain side.

Modified Embodiments of the Invention

While the 2nd-speed to 3rd-speed upshifting has been described by way of example in the illustrated embodiment, the upshift control according to the present invention is also applicable to 3rd-speed to 4th-speed upshifting in which the low clutch L/C is released and the 2-4 brake 2-4/B is engaged. In this case, the back pressure of the low clutch accumulator 9 is controlled by the low clutch sequence valve 6 (accumulator back pressure control valve). The upshift control of the present invention is also applicable to 4th-speed to 5th-speed upshifting where the automatic transmission has five gear positions.

While two duty solenoids, i.e., line pressure duty solenoid 23 and 2-4/B duty solenoid 24, are used in the control device of the illustrated embodiment, at least one of these duty solenoids may be used for controlling the accumulator pressure.

While the automatic transmission is automatically shifted up from the 2nd-speed to 3rd-speed gear position while the selector lever is placed in the D (drive) range in the illustrated embodiment, the present invention may be applied to the case where the transmission is manually shifted up from the 2nd-speed to 3rd-speed gear position. In this case, the threshold value used for determining the minimum engine load range may be set differently depending upon whether the selector lever is in the D (drive) range or in the manual range when the 2-3 upshifting occurs, so that the above-described control of inhibiting the accumulator back pressure from being drained may be implemented in an expanded or broader range of engine load when the selector level is in the manual range.

While the throttle sensor is used as engine load detecting means in the illustrated embodiment, an engine intake pressure sensor or the like may be used as the engine load detecting means.

The determination as to whether the vehicle is in the power-on or power-off state may be made, using at least one parameter selected from the throttle opening, vehicle speed, engine speed, turbine speed, oil pressure, gear position, position or range of the selector lever, mass of engine intake air, and others.

In the illustrated embodiment, the 2-4 brake sequence valve 8 operates in a selected one of two modes, i.e., a switchable mode in which the valve 8 may be switched between the pressure supply side and the drain side, and a drain inhibit mode in which the valve 8 is inhibited from being switched to the drain side, by selectively applying or not applying the high clutch PH/C as an operating signal pressure to the 2-4 brake sequence valve 8. However, the 2-4 brake sequence valve 8 may be inhibited from being switched to the drain side, by applying an external force to a spool of the valve 8 so as to lock the valve 8.

What is claimed is:

1. An upshift control device for an automatic transmission of a motor vehicle wherein the transmission is shifted up to a first gear position to be established after upshifting, by releasing an oil pressure from a first engaging element that has been engaged in a second gear position established before the upshifting while applying an oil pressure to a second engaging element that has been released in the second gear position, said upshift control device comprising:

upshifting determining means for determining whether an upshift command to shift up the transmission is generated;

engine load detecting means for detecting an engine load;

an accumulator provided in a path leading to the first engaging element that is to be released upon completion of upshifting;

an accumulator back pressure control valve using a pressure corresponding to said engine load and a pressure applied to the second engaging element as operating signal pressures, for switching from a supply position for supplying a back pressure of said accumulator to a drain position for draining the accumulator when a difference between said operating signal pressures becomes equal to a predetermined value;

a timing valve which is switched between a supply position for supplying the pressure applied to the second engaging element to said accumulator back pressure control valve and a drain position for inhibiting the pressure applied to the second engaging element from being applied to the accumulator back pressure control valve, depending upon to a signal received from a valve control actuator; and accumulator back pressure control means for generating to said valve control actuator a command to inhibit said timing valve from being switched to the drain position, when said upshift command is generated by said upshift determining means and the engine load detected by said engine load detecting means is approximately equal to a minimum value thereof.

2. An upshift control device according to claim 1, further comprising:

power-on/off determining means for determining whether the vehicle is in a power-on state in which an accelerator pedal is being depressed, or in a power-off state in which the accelerator pedal is being released, wherein said accumulator back pressure control means generates to said valve control actuator a command to inhibit said accumulator back pressure control valve from being switched to said drain position, when said upshift command is generated by said upshift determining means, and the vehicle is in the power-on state, while the engine load detected by said engine load detecting means is approximately equal to the minimum value.

3. An upshift control device for an automatic transmission according to claim 1, wherein said valve control actuator comprises a timing solenoid which generates an oil pressure in response to an ON command and does not generate an oil pressure in response to an OFF command, and said timing valve selectively supplies or stops supplying the pressure applied to the second engaging element to said accumulator back pressure control valve, using the oil pressure generated by said timing solenoid as an operating signal pressure.

* * * * *